United States Patent
Li

(10) Patent No.: US 9,287,801 B2
(45) Date of Patent: Mar. 15, 2016

(54) MICRO INVERTER WITH DC-TO-AC CONVERTER AND SOLAR PHOTOVOLTAIC SYSTEM HAVING THE SAME

(71) Applicant: DELTA ELECTRONICS, INC., Taoyuan County (TW)

(72) Inventor: Sheng-Hua Li, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 329 days.

(21) Appl. No.: 14/132,319

(22) Filed: Dec. 18, 2013

(65) Prior Publication Data

US 2014/0369098 A1    Dec. 18, 2014

(30) Foreign Application Priority Data

Jun. 13, 2013   (CN) .......................... 2013 1 0233940

(51) Int. Cl.
*H02M 3/24* (2006.01)
*H02M 7/44* (2006.01)
*H02J 3/38* (2006.01)
*H02J 13/00* (2006.01)
*H01L 31/042* (2014.01)
*H04B 3/54* (2006.01)
*H02M 7/48* (2007.01)

(52) U.S. Cl.
CPC .............. *H02M 7/44* (2013.01); *H01L 31/042* (2013.01); *H02J 3/383* (2013.01); *H02J 3/385* (2013.01); *H02J 13/002* (2013.01); *H04B 3/542* (2013.01); *H02M 7/48* (2013.01); *Y02E 10/563* (2013.01); *Y02E 40/72* (2013.01); *Y02E 60/7815* (2013.01); *Y04S 10/123* (2013.01); *Y04S 40/121* (2013.01)

(58) Field of Classification Search
CPC ........ H01L 31/042; H02J 3/385; H02J 3/383; H02J 13/002; H04B 3/542; H02M 7/48; H02M 7/44
USPC ........................................................... 363/95
See application file for complete search history.

(56) References Cited

U.S. PATENT DOCUMENTS 7,177,168 B2 *  2/2007  Toyomura et al. ............ 363/131
8,611,117 B2 * 12/2013  Kim et al. ....................... 363/95

\* cited by examiner

*Primary Examiner* — Adolf Berhane
*Assistant Examiner* — Afework Demisse
(74) *Attorney, Agent, or Firm* — Hauptman Ham, LLP

(57) ABSTRACT

A DC-to-AC converter receives a DC power generated from a solar panel and converts the received DC power into an AC power outputted through a power line. The DC-to-AC converter includes a signal input port for externally connecting an environment sensing apparatus. The environment sensing apparatus senses environment conditions around the solar panel and produces an analog sensing signal. The DC-to-AC converter receives the analog sensing signal, converts the analog sensing signal into a digital sensing signal, and outputs the digital sensing signal the power line. A micro inverter is composed of the DC-to-AC converter and the solar panel, and the micro inverter is constructed in the solar photovoltaic system, thus eliminating unnecessary hardware devices.

20 Claims, 8 Drawing Sheets

MICRO INVERTER WITH DC-TO-AC CONVERTER AND SOLAR PHOTOVOLTAIC SYSTEM HAVING THE SAME

BACKGROUND

1. Technical Field

The present disclosure relates generally to a DC-to-AC converter, and more particularly to a micro inverter with the DC-to-AC converter and a solar photovoltaic system having the same.

2. Description of Related Art

With growing concerns over renewable energy conservation, a great deal of effort has been devoted to develop various renewable energies by many manufacturers.

Take the solar energy for example, because it needs to spend a large cost to build a solar power system, the most manufacturers usually look for investors or banks to obtain sufficient funds to build the solar power system.

Generally, it is important for the manufacturers to consider whether the investment is profitable or not. For the solar power system, it is more beneficial to investors when the unit quantity of electricity generated from the solar power system gets larger. Hence, the investors usually request the manufacturer to provide environmental detections and assessments before investing the solar power system. In addition, the relevant data, such as the total power generating capacity or the power generating efficiency of the solar power system need to be monitored to meet the contract requirements after the solar power system is launched.

Reference is made to FIG. 1 which is an architecture block diagram of a related art solar power system. The conventional solar power system mainly has one or more micro inverters 1. Each micro inverter 1 has a solar panel 12 providing the photovoltaic conversion to generate a DC power, and a DC-to-AC converter 11 for converting the DC power into an AC power. All of the micro inverters 1 are connected to a power line 2, and the power line 2 is connected to a grid 3 which can be a power company. Also, the redundant AC power can be fed back and sold to the power company.

In addition, an environment sensing apparatus 6 is usually installed to sense environment conditions, such as the temperature, humidity, barometric pressure, wind intensity, rainfall density, or sunshine intensity around the solar panel 12 so as to estimate the power generating capacity of the solar power system. The environment sensing apparatus 6 will output an analog sensing signal S1 according to the sensed results. The environment sensing apparatus 6 is connected to a sensing box 61, and the sensing box 61 receives the analog sensing signal S1, converts the analog sensing signal S1 into a digital sensing signal S3, and transmits the digital sensing signal S3 to a data collection apparatus 5 in the solar power system. Accordingly, the administrators can acquire the detailed data of the solar power system by accessing the collected data in the data collection apparatus 5.

Besides connecting the environment sensing apparatus 6, such as a small weather station, to receive the analog sensing signal S1, the sensing box 61 is also connected to the data collection apparatus 5 through additional data wires, such as a RS-485, to transmit the digital sensing signal S3. In addition, in order to maintain normal operations of the sensing box 61, additional power wires are necessary to be used to connect the sensing box 61 to the power line 2 so as to provide the required AC power P1 to the sensing box 61 through the power line 2.

The cost of installing the sensing box 61 and the cost of installing the data wires and power wires increase the total facility costs of the solar power system. In addition, because the conventional sensing box, data wires, data wires, and power wires are usually installed outdoors, these units are easily damaged due to human factors or non-human factors, such as being exposed in the detrimental environmental conditions. Hence, it needs to increase costs to improve quality of sensing box 61, the data wires, and the power wires to achieve the waterproof or shockproof functions.

SUMMARY

An object of the present disclosure is to provide a micro inverter with a DC-to-AC converter and a solar photovoltaic system having the same to solve the above-mentioned problems. The DC-to-AC converter converts an analog sensing signal to a digital sensing signal, and the converted digital sensing signal is outputted through a power line.

Another object of the present disclosure is to provide a micro inverter with a DC-to-AC converter and a solar photovoltaic system having the same to solve the above-mentioned problems. The micro inverter is composed of the DC-to-AC converter and a solar panel, and the micro inverter is constructed in the solar photovoltaic system so as to eliminate unnecessary hardware devices.

In order to achieve the above-mentioned object, the DC-to-AC converter receives a DC power generated from a solar panel, converts the DC power into an AC power, and outputs the AC power through a power line. The DC-to-AC converter has a signal input port which is externally connected an environment sensing apparatus. The environment sensing apparatus senses environment conditions around the solar panel, and produces an analog sensing signal. The DC-to-AC converter receives the analog sensing signal, converts the analog sensing signal into a digital sensing signal, and outputs the digital sensing signal through the power line.

In order to achieve the above-mentioned object, a micro inverter is composed of the DC-to-AC converter and the solar panel, and at least one micro inverter is installed in the solar photovoltaic system.

The present disclosure has following features and advantages. Because the DC-to-AC converter can provide the same functions as the sensing box, the solar photovoltaic system does not additionally install a sensing box to convert the analog sensing signal outputted from the environment sensing apparatus into the digital sensing signal because the DC-to-AC converter can provide the same functions as the sensing box, thus saving the cost of installing the sensing box.

In addition, additional data wires are necessary to be used to connect to the sensing box for transmitting the converted digital sensing signal; also additional power wires are necessary to be used to receive the required power. That is, both the cost of installing the sensing box and the cost of installing the data wires and power wires can be eliminated.

Furthermore, because the conventional sensing box, data wires, data wires, and power wires are usually installed outdoors, these units are easily damaged due to human factors or non-human factors, such as being exposed in the detrimental environmental conditions. Accordingly, the improved DC-to-AC converter is installed with the solar panel and provides preferred safety, such as waterproof or shockproof functions so as to increase stability of the solar photovoltaic system.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
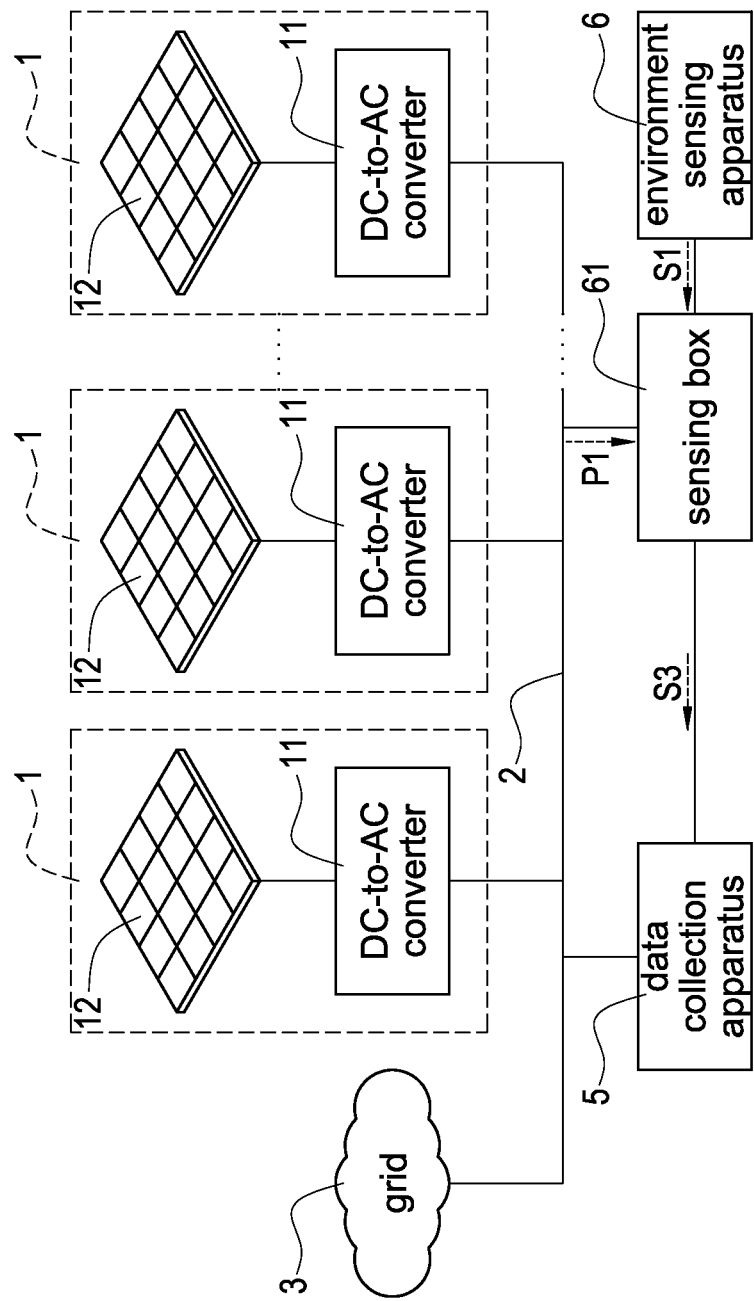
FIG. 1 is an architecture block diagram of a related art solar power system.

Reference will now be made to the drawing figures to describe the present invention in detail.

Figure 2:
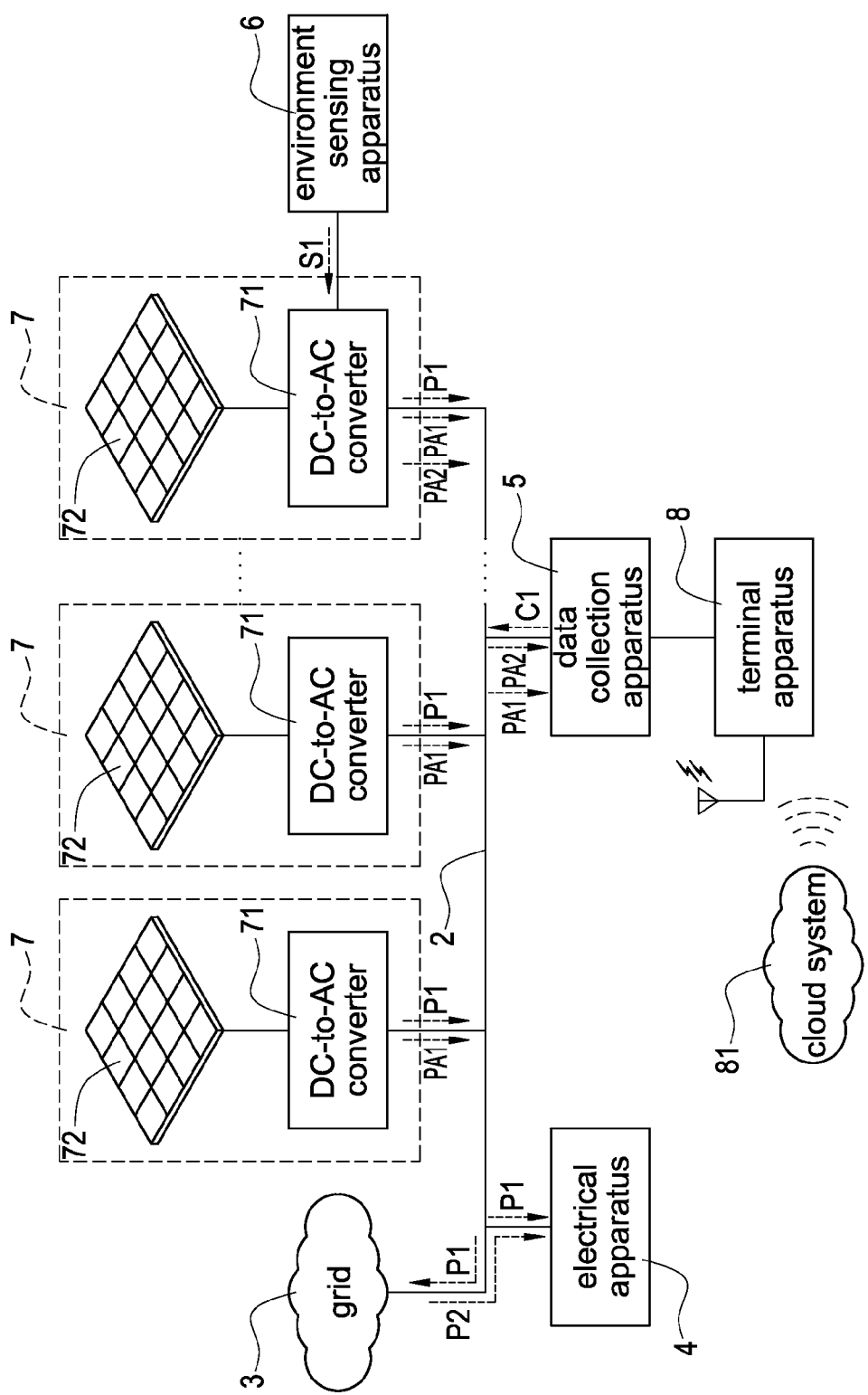
FIG. 2 is a structure diagram of a solar photovoltaic system according to a first embodiment of the present disclosure.
Figure 3:
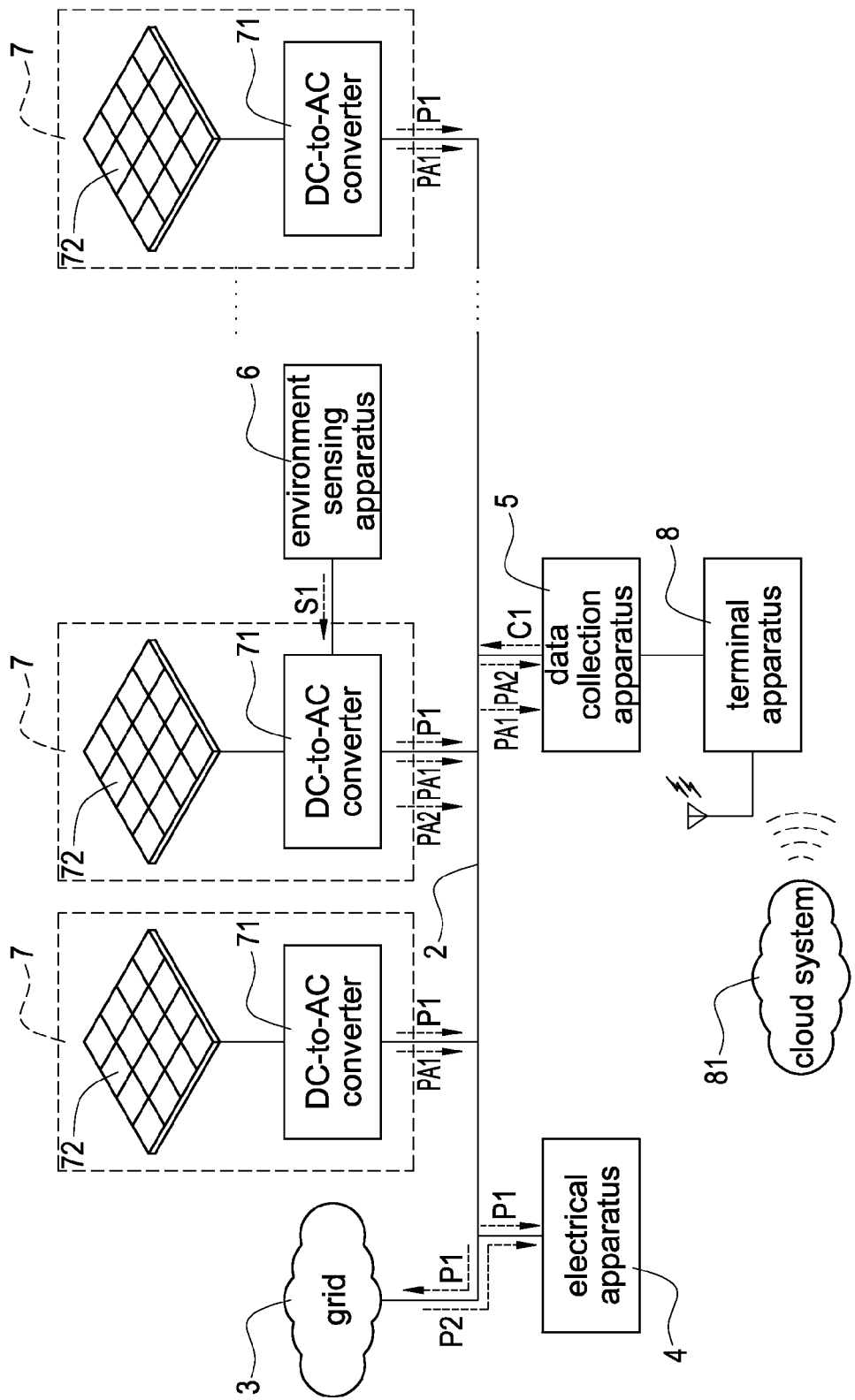
FIG. 3 is a structure diagram of the solar photovoltaic system according to a second embodiment of the present disclosure.

Reference is made to FIG. 2 and FIG. 3 which are structure diagrams of a solar photovoltaic system according to a first embodiment and a second embodiment of the present disclosure, respectively. An improved DC-to-AC converter 71 is disclosed in the present disclosure. The DC-to-AC converter 71 can directly connect to an environment sensing apparatus 6 through a circuit line, and receives a sensing signal outputted from the environment sensing apparatus 6. In particular, the sensing signal is an analog sensing signal S1. The DC-to-AC converter 71 converts the analog sensing signal S1 into a digital sensing signal S3 and outputs the digital sensing signal S3.

In this embodiment, the DC-to-AC converter 71 is connected to a solar panel 72, also referred to as a solar photovoltaic panel. A micro inverter 7 is composed of the DC-to-AC converter 71 and the solar panel 72. As shown in FIG. 2, a solar photovoltaic system mainly includes a power line 2, a data collection apparatus 5, at least one micro inverter 7, and at least one environment sensing apparatus 6. In this embodiment, the number of the environment sensing apparatus 6 is one for demonstration. In addition, the environment sensing apparatus 6 can be connected to any one of the micro inverters, not be limited to the first one or the latest one as shown in FIG. 2 and FIG. 3.

In FIG. 2 and FIG. 3, the number of the micro inverter 7 is three for demonstration. However, the embodiment is only exemplified but is not intended to limit the scope of the disclosure.

Especially, all of the micro inverters 7 can correspondingly use the DC-to-AC converters 71 with the analog-to-digital function or only one of the micro inverters 7 uses the DC-to-AC converters 71 with the analog-to-digital function but other micro inverters 7 correspondingly use the DC-to-AC converters 71 without the analog-to-digital function. Also, the environment sensing apparatus 6 is connected to the DC-to-AC converters 71 with the analog-to-digital function. However, the embodiments are only exemplified but are not intended to limit the scope of the disclosure.

As shown in FIG. 2 and FIG. 3, the environment sensing apparatus 6 is connected to one of the micro inverters 7, and the micro inverters 7 and the data collection apparatus 5 are connected to the power line 2. Also, the other terminal of the power line 2 is connected to a grid 3 which can be a power company, but not limited.

The solar panels 72 are installed on the outside of the house to receive a light source for generating electricity. The generated electricity of the solar panel 72 is the DC power. The DC-to-AC converters 71 is connected to the solar panel 72 to receive the generated DC power and convert the DC power into an AC power P1 which is outputted through the power line 2. In this embodiment, the AC power P1 outputted from the DC-to-AC converters 71 is transmitted to the grid 3 through the power line 2. Also, the redundant AC power can be fed back and sold to the power company. Further, if other electrical apparatuses 4, such as televisions, air conditioners, or refrigerators are connected to the power line 2, the AC power P1 outputted from the DC-to-AC converters 71 can supply power to the electrical apparatuses 4.

In addition, because the power line 2 is connected to the grid 3, the power line 2 can receive the AC power P2 outputted from the grid 3. In particular, the AC power P2 can be the AC utility power. Accordingly, the electrical apparatuses 4 can be supplied by the AC power P2 outputted from the grid 3 through the power line 2.

The data collection apparatus 5 produces a command C1 and transmits the command C1 to the micro inverter 7 through the power line 2. In particular, the command C1 can be a connection command or an inquiry command, but not limited. If the command C1 is the inquiry command, the micro inverter 7 can inquire the relevant data, such as the total power generating capacity or the power generating efficiency of the solar panel 72 according to the inquiry command when the micro inverter 7 receives the command C1 via the DC-to-AC converter 71. The DC-to-AC converter 71 produces a corresponding energy data package PA1 according to the inquired results, and the energy data package PA1 is transmitted to the data collection apparatus 5 through the power line 2. Accordingly, the administrator can acquire the detailed data of the micro inverter 7 by accessing the collected data in the data collection apparatus 5.

The solar photovoltaic system further includes a terminal apparatus 8 which is electrically connected to the data collection apparatus 5. In this embodiment, the terminal apparatus 8 is a wireless router, a wireless access point (wireless AP), a wireless card, modem, or other electronic devices with ability of network connection. The data collection apparatus 5 can connect to the network through the terminal apparatus 8 and further connect to a cloud system 81. The cloud system 81 can be the server, the database, or the cloud interface. The data collection apparatus 5 can output the energy data package PA1 to the cloud system 81. Also, the administrator can control the data collection apparatus 5 or access the collected data in the data collection apparatus 5 through the cloud system 81.

In this embodiment, the environment sensing apparatus 6 is installed around or near the solar panel 72 for sensing environment conditions, such as the temperature, humidity, barometric pressure, wind intensity, rainfall density, or sunshine intensity around the solar panel 72. The environment sensing apparatus 6 can be a thermometer, hygrometer, barometer, wind sensor, rain sensor, pyranometer, which is used to sense the above-mentioned environment conditions, and the analog sensing signal S1 is produced according to the sensed results.

The environment sensing apparatus 6 directly transmits the analog sensing signal S1 to the DC-to-AC converter 71 of the micro inverter 7. Afterward, the DC-to-AC converter 71 executes an analog-to-digital conversion to the analog sensing signal S1, and a sensing data package PA2 is produced according to the conversion results. The micro inverter 7 transmits the sensing data package PA2 to the data collection apparatus 5 through the power line 2. Accordingly, the administrator can login the data collection apparatus 5 to access the sensing data package PA2. In addition, the sensing data package PA2 can be directly or indirectly outputted from the data collection apparatus 5 to the cloud system 81 through the terminal apparatus 8.

Figure 4:
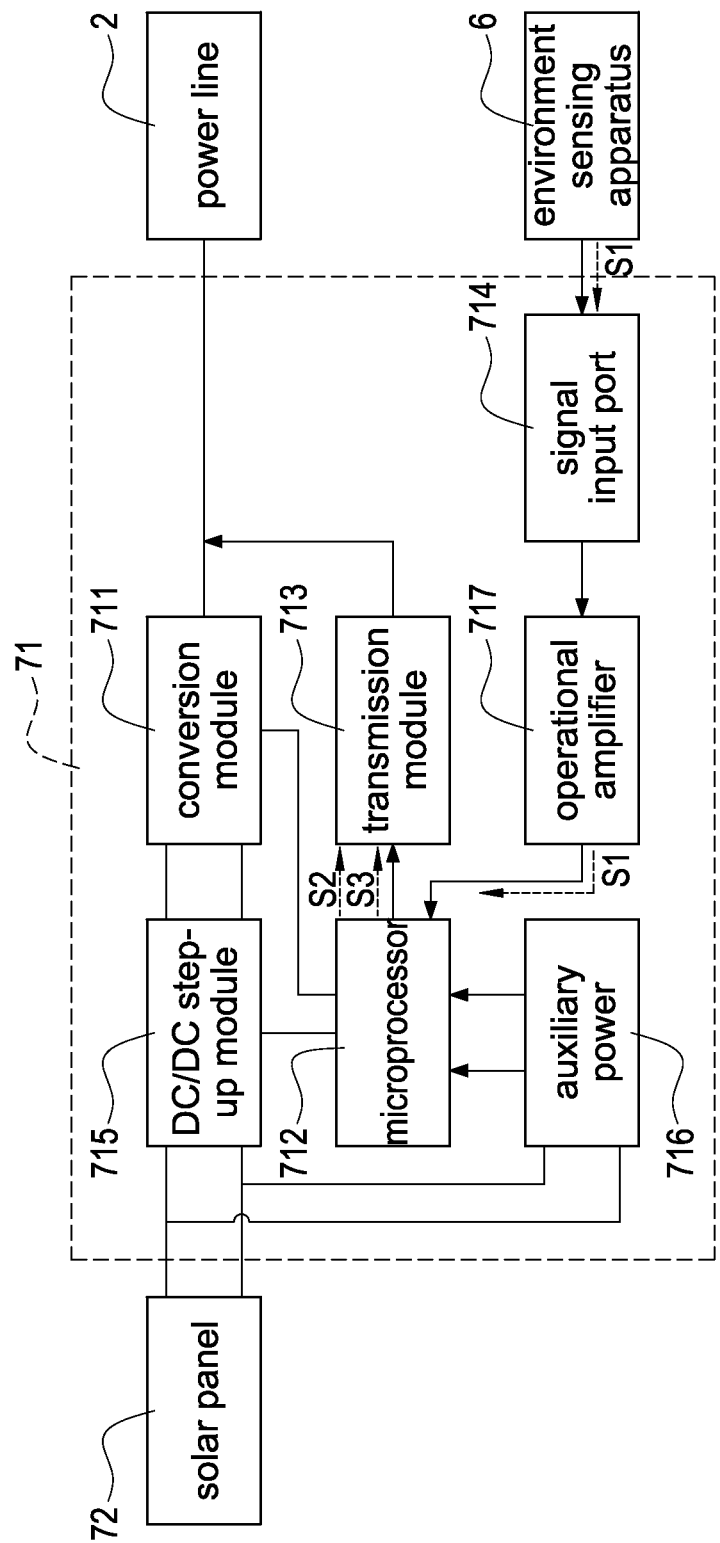
FIG. 4 is a block diagram of a DC-to-AC converter according to a first embodiment of the present disclosure.

Reference is made to FIG. 4 which is a block diagram of a DC-to-AC converter according to a first embodiment of the present disclosure. The DC-to-AC converter 71 is connected to the power line 2, the solar panel 72, and the environment sensing apparatus 6. Especially, when multiple DC-to-AC converters 71 corresponding to multiple micro inverters 7 and only one environment sensing apparatus 6 are used in the solar photovoltaic system, one of the DC-to-AC converters 71 is connected to the environment sensing apparatus 6. However, the environment sensing apparatus 6 can be also simultaneously connected to multiple DC-to-AC converters 71, and the analog sensing signal S1 is synchronous or asynchronously outputted to the multiple DC-to-AC converters 71.

The DC-to-AC converter 71 mainly has a conversion module 711, a microprocessor 712, a transmission module 713, and a signal input port 714. The conversion module 711 is connected to the solar panel 72 and the power line 2, and receives the DC power generated from the solar panel 72, converts the DC power into the AC power P1, and outputs the AC power P1 through the power line 2. Especially, the DC-to-AC converter 71 further has a DC/DC step-up module 715, and the DC/DC step-up module 715 is electrically connected between the solar panel 72 and the conversion module 711. The DC/DC step-up module 715 receives the DC power generated from the solar panel 72 and boosts the DC power. The boosted DC power is outputted to the conversion module 711 to be converted into the AC power P1.

The microprocessor 712 mainly electrically connected to the conversion module 711 and the solar panel 72. In particular, the microprocessor 712 can be directly connected to the solar panel 72 or indirectly connected to the solar panel 72 through the DC/DC step-up module 715 or through the conversion module 711 (if absence of the DC/DC step-up module 715). However, the embodiments are only exemplified but are not intended to limit the scope of the disclosure. The microprocessor 712 is used to control the conversion module 711 and the DC/DC step-up module 715. Also, the microprocessor 712 receives a command transmitted from the power line 2 via the conversion module 711, and inquires relevant data according to contents of the command. In particular, the command can be the command C1 produced from the data collection apparatus 5, but not limited.

The microprocessor 712 inquires relevant data, such as the total power generating capacity or the power generating efficiency of the solar panel 72 according to contents of the command C1, and produces a solar panel signal S2 according to the inquired results. In particular, the solar panel signal S2 is a digital signal.

In addition, the microprocessor 712 is electrically connected to the signal input port 714. The DC-to-AC converter 71 is connected to the environment sensing apparatus 6 through the signal input port 714, and receives a sensing signal produced from the environment sensing apparatus 6. In particular, the sensing signal is the analog sensing signal S1. The microprocessor 712 receives the analog sensing signal S1 outputted from the signal input port 714, and converts the analog sensing signal S1 into a digital sensing signal S3 by an internal analog-to-digital function of the microprocessor 712. As shown in FIG. 4, the microprocessor 712 can produce and output the solar panel signal S2 and/or the digital sensing signal S3 according to different demands.

The transmission module 713 is electrically connected to the microprocessor 712 and the power line 2. The transmission module 713 receives the signal outputted from the microprocessor 712, and packetizes the signal into packages which can be transmitted and outputted by the power line 2. In this embodiment, the transmission module 713 receives the solar panel signal S2 produced from the microprocessor 712, and the solar panel signal S2 is packetized into the energy data package PA1 which is transmitted and outputted by the power line 2. In addition, the transmission module 713 further receives the digital sensing signal S3 produced from the microprocessor 712, and the digital sensing signal S3 is packetized into the sensing data package PA2 which is transmitted and outputted by the power line 2.

The DC-to-AC converter 71 further has an auxiliary power 716 which is electrically connected between the solar panel 72 and the microprocessor 712. The auxiliary power 716 receives the DC power generated from the solar panel 72, converts the voltage level of the DC power into the appropriate voltage level for the microprocessor 712, and supplies power to the microprocessor 712.

The DC-to-AC converter 71 further has an operational amplifier 717 which is electrically connected between the signal input port 714 and the microprocessor 712. The operational amplifier 717 receives the analog sensing signal S1 outputted from the signal input port 714, and amplifies the analog sensing signal S1. The operational amplifier 717 further outputs the amplified analog sensing signal S1 to the microprocessor 712 so that the amplified analog sensing signal S1 can be processed by the microprocessor 712.

In this embodiment, the microprocessor 712 is an integrated circuit (IC) with the built-in analog-to-digital function. When the microprocessor 712 is arranged on a circuit board (not shown), pins of the microprocessor 712 are connected to wires on the circuit board so that the analog sensing signal S1 can be transmitted to the microprocessor 712 through the wires and the pins to enable the analog-to-digital function, thus converting the analog sensing signal S1 into the digital sensing signal S3.

Figure 5:
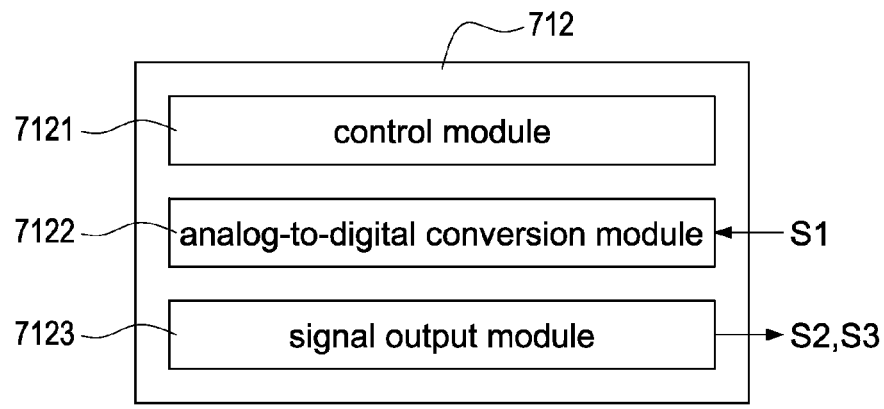
FIG. 5 is a block diagram of a microprocessor according to a first embodiment of the present disclosure.

Reference is made to FIG. 5 which is a block diagram of a microprocessor according to a first embodiment of the present disclosure. The microprocessor 712 mainly has a control module 7121, an analog-to-digital conversion module 7122, and a signal output module 7123. Especially, the control module 7121, the analog-to-digital conversion module 7122, and the signal output module 7123 can be implemented by the physical hardware, or functional software or firmware.

The control module 7121 receives and processes the command C1 transmitted from the power line 2, and inquires relevant data according to contents of the command C1. Also, the control module 7121 produces the corresponding solar panel signal S2 according to the inquired results.

The analog-to-digital conversion module 7122 converts the analog-format signal (such as the analog sensing signal S1) into the digital-format signal (such as the digital sensing signal S3).

The signal output module 7123 outputs signals and data to the transmission module 713. In this embodiment, the signal output module 7123 outputs the solar panel signal S2 produced from the control module 7121 to the transmission module 713, and also outputs the digital sensing signal S3 produced from the analog-to-digital conversion module 7122 to the transmission module 713. Especially, the microprocessor 712 can provide other functions by using other corresponding physical or virtual modules besides the above-mentioned three modules.

Figure 6:
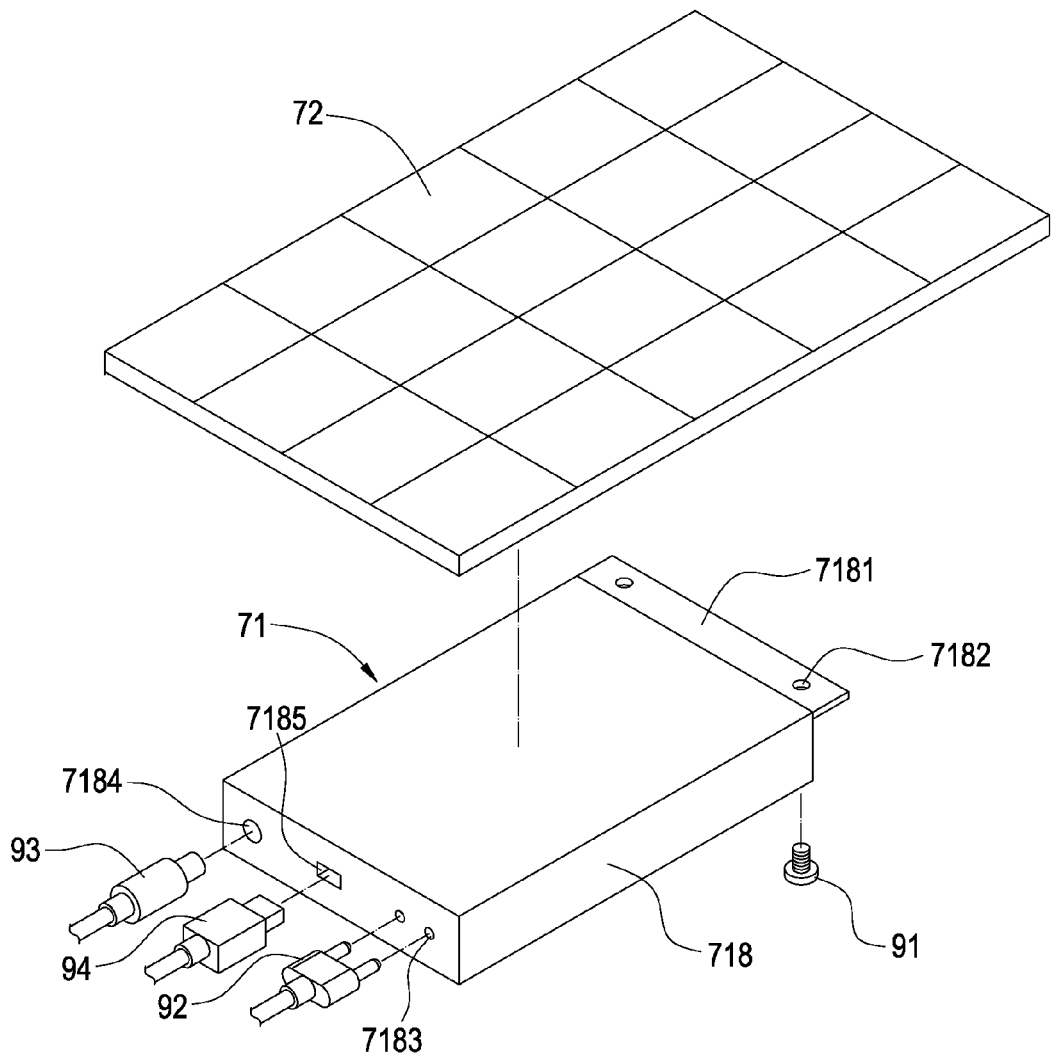
FIG. 6 is a schematic view of a micro inverter according to a first embodiment of the present disclosure.

Reference is made to FIG. 6 which is a schematic view of a micro inverter according to a first embodiment of the present disclosure. The micro inverter 7 is composed of one DC-to-AC converter 71 and one solar panel 72. In particular, the DC-to-AC converter 71 is fixed on solar panel 72 but is also detachable from the solar panel 72, but not limited.

The DC-to-AC converter 71 has a housing 718 which is used to cover all components of the DC-to-AC converter 71, including the conversion module 711, the microprocessor 712, the transmission module 713, the signal input port 714, the DC/DC step-up module 715, and the auxiliary power 716. In this embodiment, the housing 718 is composed of a waterproof material so that the DC-to-AC converter 71 can provide the waterproof function when outdoors using with the solar panel 72.

A fix board 7181 is installed extending from one side of the housing 718, and at least one opening hole 7182 is opened on the fix board 7181. In this embodiment, the DC-to-AC converter 71 further has at least one locking element 91, and the number of the locking element 91 is corresponding to that of the opening hole 7182. Accordingly, the DC-to-AC converter 71 can be fixed on the solar panel 72 by using the at least one opening hole 7182 and the at least one locking element 91. In particular, the opening hole 7182 can be the tapped hole with the corresponding size and thread so as to be appropriately locked to the at least one locking element 91.

Furthermore, two DC power connection holes 7183, one AC power connection hole 7184, and one signal connection hole 7185 are opened on the housing 718. The two DC power connection holes 7183 connect to an external DC power wire 92, and the external DC power wire 92 is also connected to the solar panel 72 so as to receive the DC power outputted from the solar panel 72. The AC power connection hole 7184 connects to an external AC power wire 93, and the external AC power wire 93 is also connected to the power line 2 so as to transmit the AC power P1 converted from the DC-to-AC converter 71 to the power line 2.

The signal input port 714 of the DC-to-AC converter 71 is installed in the signal connection hole 7185, and one part of the signal input port 714 is exposed outside the housing 718. An analog signal transmission wire 94 is externally inserted into the signal connection hole 7185 of the DC-to-AC converter 71. In particular, a connection plug of the analog signal transmission wire 94 is substantially penetrated through the signal connection hole 7185 and connected to the signal input port 714.

The DC-to-AC converter 71 is connected to the environment sensing apparatus 6 through the analog signal transmission wire 94 so that the environment sensing apparatus 6 transmits the analog sensing signal S1 to the DC-to-AC converter 71 through the analog signal transmission wire 94.

Figure 7:
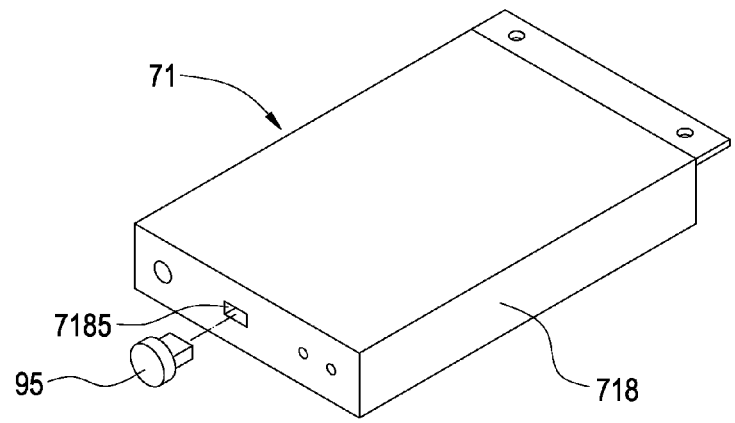
FIG. 7 is a schematic view of a DC-to-AC converter according to a first embodiment of the present disclosure.
Figure 8:
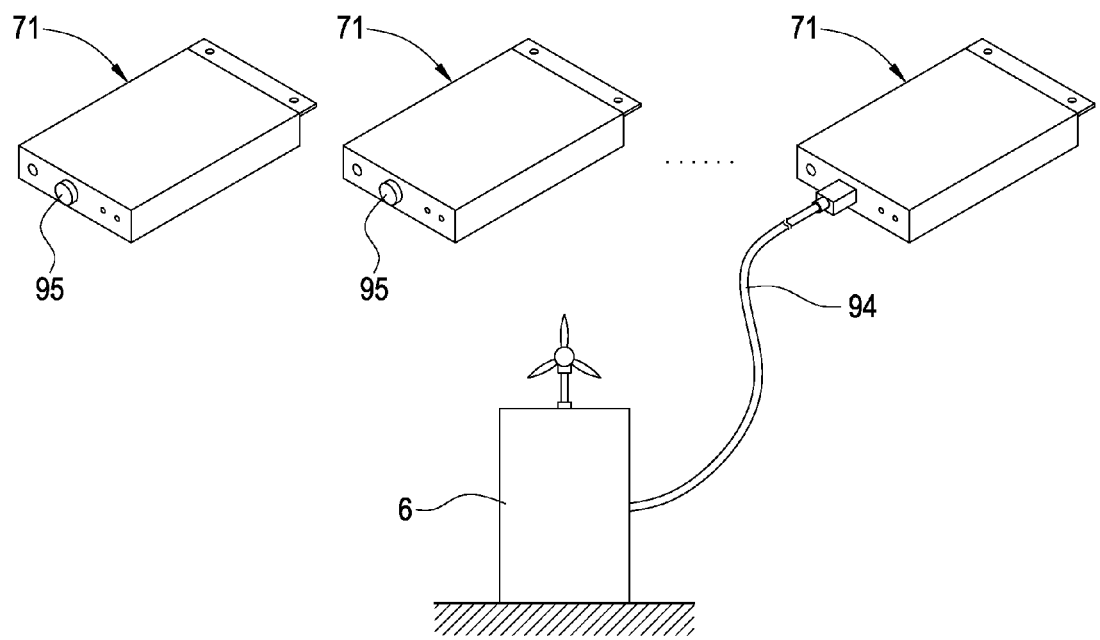
FIG. 8 is a schematic view of the DC-to-AC converter according to a second embodiment of the present disclosure.

Reference is made to FIG. 7 and FIG. 8 which are schematic views of the DC-to-AC converter according to a first embodiment and a second embodiment of the present disclosure, respectively. As shown in FIG. 7, the DC-to-AC converter 71 further has a waterproof plug 95 which is inserted into the signal connection hole 7185 but is also detachable from the signal connection hole 7185. When the analog signal transmission wire 94 does not be inserted into the signal connection hole 7185, the waterproof plug 95 can be inserted into the signal connection hole 7185 to implement the waterproof function.

As shown in FIG. 8, when multiple DC-to-AC converters 71 corresponding to multiple micro inverters 7 are used in the solar photovoltaic system, one of the DC-to-AC converters 71 is connected to the environment sensing apparatus 6 by inserting the analog signal transmission wire 94 into the signal connection hole 7185. For this reason, the waterproof plugs 95 are inserted into the signal connection holes 7185 of other DC-to-AC converters 71, respectively, to provide the waterproof protection from invading external water vapor, moisture, or dirt so as to protect the DC-to-AC converter 71.

Figure 9:
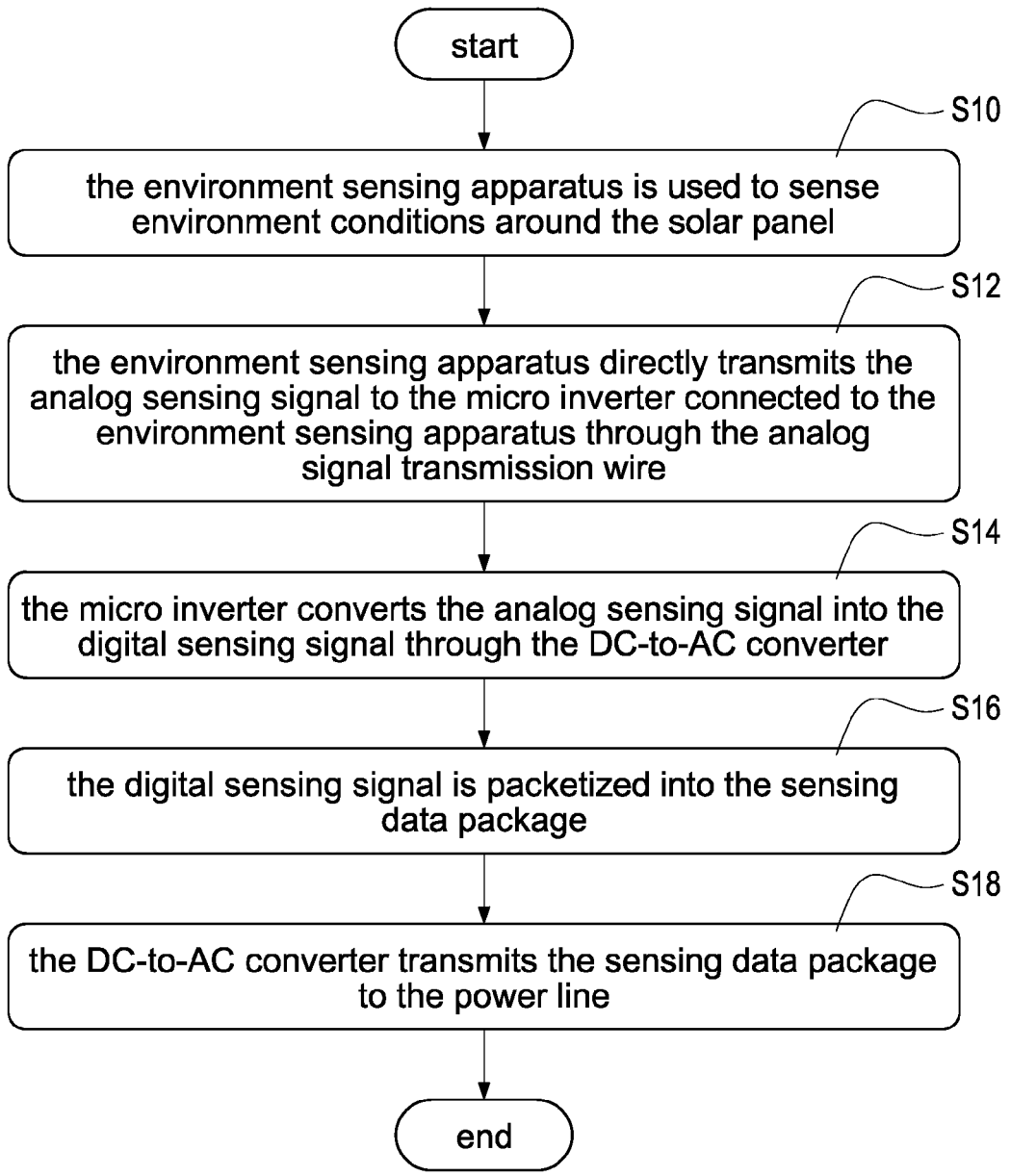
FIG. 9 is a flowchart of signal conversion according to a first embodiment of the present disclosure.

Reference is made to FIG. 9 which is a flowchart of signal conversion according to a first embodiment of the present disclosure. First, the environment sensing apparatus 6 is used to sense environment conditions around the solar panel 72 (S10) and produce the analog sensing signal S1. Afterward, the environment sensing apparatus 6 directly transmits the analog sensing signal S1 to the micro inverter 7 connected to the environment sensing apparatus 6 through the analog signal transmission wire 94 (S12). In particular, the environment sensing apparatus 6 transmits the analog sensing signal S1 to the DC-to-AC converter 71 of the micro inverter 7.

Afterward, the micro inverter 7 converts the analog sensing signal S1 into the digital sensing signal S3 through the DC-to-AC converter 71 (S14). In particular, the DC-to-AC converter 71 produces the digital sensing signal S3 through the microprocessor 712 inside the DC-to-AC converter 71, and packetizes the digital sensing signal S3 into the sensing data package PA2 (S16). Finally, the DC-to-AC converter 71 transmits the sensing data package PA2 to the power line 2 (S18), and then the sensing data package PA2 is transmitted to the data collection apparatus 5, namely, to the administrator.

In the present disclosure, the energy data package PA1 and the sensing data package PA2 produced from multiple micro inverters 7 are uploaded to the power line 2, and transmitted to the data collection apparatus 5 through the power line 2 so that the transmitted data packages PA1, PA2 can be stored, and also accessed and examined by the administrator. Because the power line 2 can only transmit and receive the packages with the specific format, the package format of the energy data package PA1 and the sensing data package PA2 must be meet the specific format so that the data packages PA1, PA2 can be transmitted through the power line 2. In addition, in order to distinguish between the energy data package PA1 and the sensing data package PA2, an identification bit B1 of the energy data package PA1 is different from that of the sensing data package PA2.

Figure 10:
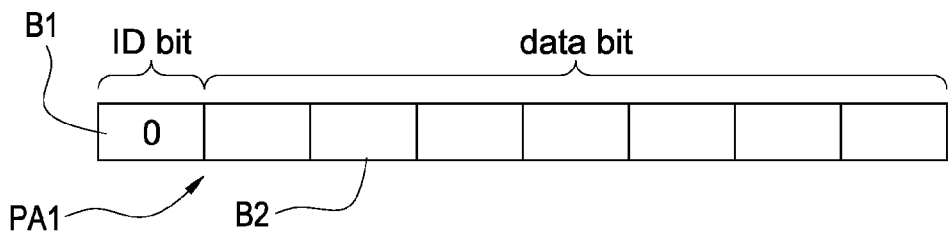
FIG. 10 is a schematic view of a data package according to a first embodiment of the present disclosure.
Figure 11:
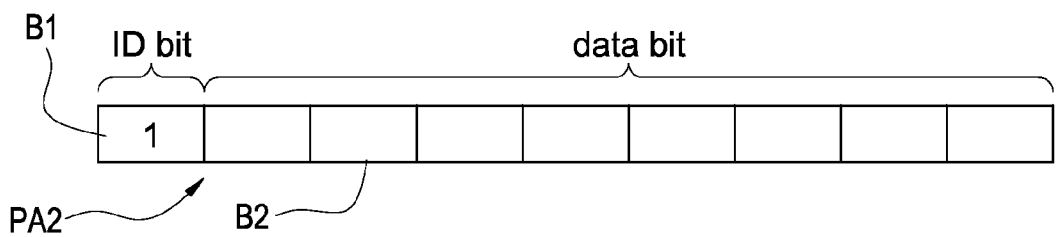
FIG. 11 is a schematic view of the data package according to a second embodiment of the present disclosure.

Reference is made to FIG. 10 and FIG. 11 which are schematic views of a data package according to a first embodiment and a second embodiment of the present disclosure, respectively. The package, including the energy data package PA1 and the sensing data package PA2, mainly has an identification bit B1 and plural data bits B2. In this embodiment, the identification bit B1 is provided to identify whether the package is the energy data package PA1 or the sensing data package PA2. As shown in FIG. 10, when the energy data package PA1 is packetized by the transmission module 713, the identification bit B1 of the energy data package PA1 is set to "0". Also, as shown in FIG. 11 when the sensing data package PA2 is packetized by the transmission module 713, the identification bit B1 of the sensing data package PA2 is set to "1". In addition, contents and length of the contents can be adjusted according to contents and length of the solar panel signal S2 and the digital sensing signal S3.

Especially, the identification bit B1 is equal to "0" and "1" that is not limited to correspond to the energy data package PA1 and the sensing data package PA2, respectively. On the contrary, when the energy data package PA1 is packetized by the transmission module 713, the identification bit B1 of the energy data package PA1 is set to "1"; when the sensing data package PA2 is packetized by the transmission module 713, the identification bit B1 of the sensing data package PA2 is set to "0". Further, the length of the identification bit B1 is determined according to the transfer protocol of the power line 2, but not limited to one bit. However, the embodiment is only exemplified but is not intended to limit the scope of the disclosure.

Figure 12:
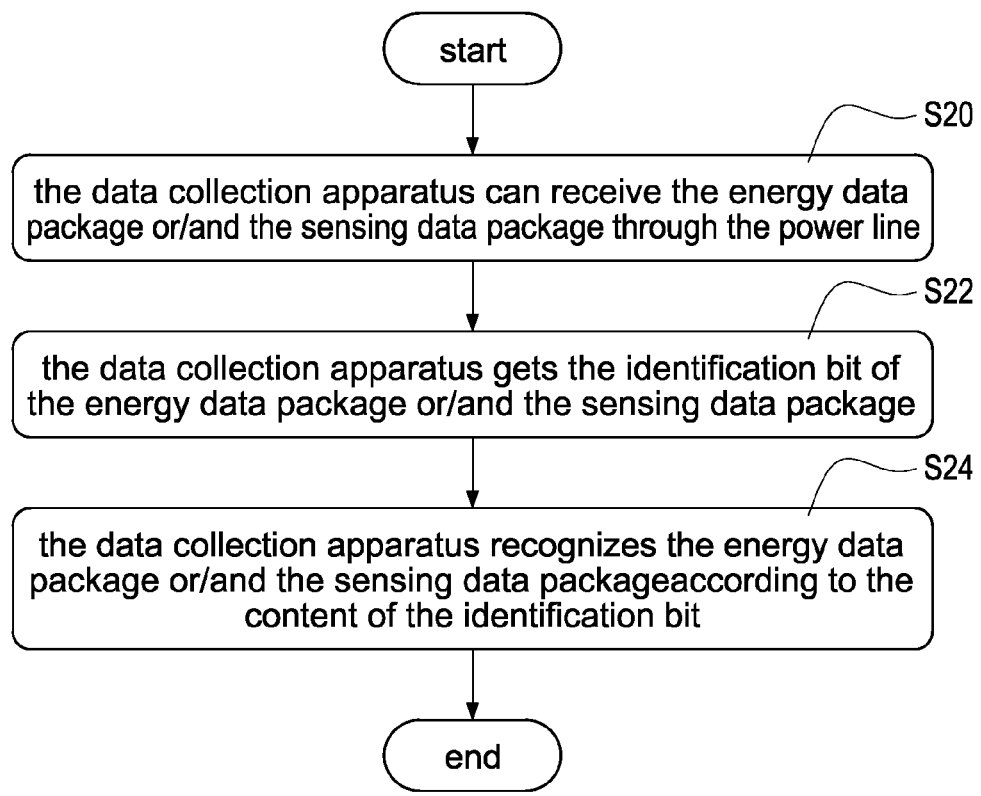
FIG. 12 is a flowchart of data package reception according to a first embodiment of the present disclosure.

Reference is made to FIG. 12 which is a flowchart of data package reception according to a first embodiment of the present disclosure. When the micro inverter 7 outputs the energy data package PA1 or/and the sensing data package PA2, the data collection apparatus 5 can receive the energy data package PA1 or/and the sensing data package PA2 through the power line 2 (S20). In this embodiment, the data collection apparatus 5 first gets the identification bit B1 of the energy data package PA1 or/and the sensing data package PA2 (S22), and then the data collection apparatus 5 recognizes the energy data package PA1 or/and the sensing data package PA2 according to the content of the identification bit B1 (S24). Finally, the data collection apparatus 5 outputs or stores the data packages PA1, PA2 after recognizing the data packages PA1, PA2.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A DC-to-AC converter comprising:
   a conversion module connected to a solar panel and a power line and configured to receive a command, the power line configured to output an AC power outputted from the conversion module;
   a signal input port configure to receive a sensing signal; wherein the sensing signal is an analog sensing signal;
   a microprocessor electrically connected to the conversion module, the signal input port, and the solar panel, and configured to control the conversion module to receive the command, inquire relevant data of the solar panel according to the command and produce a solar panel signal, and convert the analog sensing signal received by the signal input port into a digital sensing signal; and
   a transmission module electrically connected to the microprocessor and the power line, and configured to receive the solar panel signal and packetize the solar panel signal into an energy data package, and receive the digital sensing signal and packetize the digital sensing signal into a sensing data package; the energy data package and the sensing data package configured to be outputted through the power line.

2. The DC-to-AC converter in claim 1, further comprising:
   a DC/DC step-up module electrically connected between the solar panel and the conversion module, and configured to boost a DC power outputted from the solar panel and output the boosted DC power to the conversion module; and
   an auxiliary power electrically connected to the solar panel and the microprocessor, and configured to supply power to the microprocessor.

3. The DC-to-AC converter in claim 1, further comprising:
   an operational amplifier electrically connected between the signal input port and the microprocessor, and configured to amplify the analog sensing signal and output the amplified analog sensing signal to the microprocessor.

4. The DC-to-AC converter in claim 1, wherein the microprocessor comprises:
   a control module configured to process the command transmitted from the power line, and inquire the relevant data of the solar panel according to the command and produce the solar panel signal according to the relevant data of the solar panel;
   an analog-to-digital conversion module configured to convert the analog sensing signal into the digital sensing signal; and
   a signal output module configured to output the solar panel signal and the digital sensing signal to the transmission module.

5. The DC-to-AC converter in claim 1, further comprising:
   a housing configured to cover the conversion module, the microprocessor, the transmission module, and the signal input port; wherein the housing is composed of a waterproof material.

6. The DC-to-AC converter in claim 5, wherein the housing is configured to open a signal connection hole on one side of the housing; the signal input port is penetrated through the signal connection hole and exposed outside the housing, and is configured to connect an analog signal transmission wire to receive the analog sensing signal transmitted from the analog signal transmission wire.

7. The DC-to-AC converter in claim 6, further comprising:
   a waterproof configured to be inserted into and detachable from the signal connection hole.

8. A micro inverter comprising:
   a solar panel configured to receive an external light source and generate a DC power; and
   a DC-to-AC converter electrically connected to the solar panel and a power line, and configured to convert the DC power into an AC power, and the power line configured to output the AC power;
   wherein the DC-to-AC converter has a signal input port, a microprocessor electrically connected to the signal input port, and a transmission module electrically connected to the microprocessor and the power line; the signal input port is configured to externally receive an analog sensing signal and the microprocessor is configured to convert the analog sensing signal into a digital sensing signal, and the transmission module is configured to receive the digital sensing signal produced from the microprocessor and packetize the digital sensing signal into a sensing data package, and the sensing data package is outputted through the power line.

9. The micro inverter in claim 8, wherein the DC-to-AC converter is configured to receive a command through the power line, and configured to inquire relevant data of the solar panel according to the command and produce a solar panel signal; the transmission module is configured to receive the solar panel signal and packetize the solar panel signal into an energy data package, and the energy data package is outputted through the power line.

10. The micro inverter in claim 9, wherein the microprocessor of the DC-to-AC converter comprises:
   a control module configured to process the command transmitted from the power line, and inquire the relevant data of the solar panel according to the command and produce the solar panel signal according to the relevant data of the solar panel;
   an analog-to-digital conversion module configured to convert the analog sensing signal into the digital sensing signal; and
   a signal output module configured to output the solar panel signal and the digital sensing signal to the transmission module.

11. The micro inverter in claim 8, wherein the DC-to-AC converter further comprises an operational amplifier, the operational amplifier is electrically connected between the signal input port and the microprocessor, and is configured to amplify the analog sensing signal and output the amplified analog sensing signal to the microprocessor.

12. The micro inverter in claim 8, wherein the DC-to-AC converter further comprises a housing, the housing is configured to cover the conversion module, the microprocessor, the transmission module, and the signal input port; wherein the housing is composed of a waterproof material; the housing has a fix board extended from one side of the housing, and at least one opening hole is opened on the fix board; the DC-to-AC converter is fixed on the solar panel through the at least one opening hole and at least one locking element.

13. The micro inverter in claim 12, wherein the housing is configured to open a signal connection hole on one side of the housing; the signal input port is penetrated through the signal connection hole and exposed outside the housing, and is configured to connect an analog signal transmission wire to receive the analog sensing signal transmitted from the analog signal transmission wire.

14. The micro inverter in claim 13, further comprising:
   a waterproof configured to be inserted into and detachable from the signal connection hole.

15. A solar photovoltaic system comprising:
   a power line;
   a micro inverter connected to the power line, and the micro inverter comprising a solar panel and a DC-to-AC converter connected to the solar panel; wherein the solar panel is configured to receive an external light source and generate a DC power, and the DC-to-AC converter is configured to convert the DC power into an AC power, and the power line is configured to output the AC power;
   a data collection apparatus connected to the power line, and configured to transmit a command to the micro inverter through the power line, and configured to receive an energy data package transmitted from the micro invert according to the command; and
   an environment sensing apparatus connected to the DC-to-AC converter of the micro inverter, and configured to sense environment conditions around the solar panel, produce an analog sensing signal, and transmit the analog sensing signal to the DC-to-AC converter;
   wherein the DC-to-AC converter is configured to convert the analog sensing signal into a digital sensing signal, packetize the digital sensing signal into a sensing data package, and output the sensing data package to the data collection apparatus through the power line.

16. The solar photovoltaic system in claim 15, further comprising:
   a terminal apparatus electrically connected to the data collection apparatus, and the data collection apparatus connected to a cloud system through the terminal apparatus, and configured to output the energy data package and the sensing data package to the cloud system.

17. The solar photovoltaic system in claim 15, wherein the DC-to-AC converter comprising:
   a conversion module connected to the solar panel and the power line, and configured to receive the DC power outputted from the solar panel, convert the DC power into the AC power, and output the AC power through the power line;
   a signal input port connected to the environment sensing apparatus, and configured to receive the analog sensing signal transmitted from the environment sensing apparatus;
   a microprocessor electrically connected to the conversion module, the signal input port, and the solar panel, and configured to receive the command transmitted from the power line, inquire relevant data of the solar panel according to the command and produce a solar panel signal, and receive the analog sensing signal and convert the analog sensing signal into the digital sensing signal; and
   a transmission module electrically connected to the microprocessor and the power line, and configured to receive the solar panel signal and packetize the solar panel signal into an energy data package, and receive the digital sensing signal and packetize the digital sensing signal into a sensing data package; the energy data package and the sensing data package configured to be outputted through the power line.

18. The solar photovoltaic system in claim 17, wherein the microprocessor of the DC-to-AC converter comprises:
   a control module configured to process the command transmitted from the power line, and inquire the relevant data of the solar panel according to the command and produce the solar panel signal according to the relevant data of the solar panel;
   an analog-to-digital conversion module configured to convert the analog sensing signal into the digital sensing signal; and
   a signal output module configured to output the solar panel signal and the digital sensing signal to the transmission module.

19. The solar photovoltaic system in claim 17, wherein the DC-to-AC converter further comprises a housing, the housing is configured to cover the conversion module, the microprocessor, the transmission module, and the signal input port; wherein the housing is composed of a waterproof material; the housing has a fix board extended from one side of the housing, and at least one opening hole is opened on the fix board; the DC-to-AC converter is fixed on the solar panel through the at least one opening hole and at least one locking element.

20. The solar photovoltaic system in claim 19, wherein the housing is configured to open a signal connection hole on one side of the housing; the signal input port is penetrated through the signal connection hole and exposed outside the housing, and is configured to connect an analog signal transmission wire to connect to the environment sensing apparatus through the analog signal transmission wire.

* * * * *